(12) United States Patent
Coutarel

(10) Patent No.: US 6,227,250 B1
(45) Date of Patent: May 8, 2001

(54) LAGGED PIPE FOR TRANSPORTING FLUIDS

(75) Inventor: Alain Coutarel, Mont-Saint-Aignan (FR)

(73) Assignee: Coflexip (FR)

( * ) Notice: Subject to any disclaimer, the term of this patent is extended or adjusted under 35 U.S.C. 154(b) by 0 days.

(21) Appl. No.: 09/448,539

(22) Filed: Nov. 23, 1999

(30) Foreign Application Priority Data

Apr. 30, 1999 (FR) .................................................. 99 05509
Aug. 6, 1999 (FR) .................................................. 99 10266

(51) Int. Cl.⁷ ....................................................... F16L 9/14
(52) U.S. Cl. ........................ 138/149; 138/129; 138/144
(58) Field of Search ................................. 138/149, 144, 138/129

(56) References Cited

U.S. PATENT DOCUMENTS

| 2,225,333 | * 12/1940 | Daniels | ............................. 138/134 X |
| 3,804,438 | 4/1974 | Humphries et al. | ................... 285/47 |
| 3,853,149 | * 12/1974 | Stine | ............................... 138/149 X |
| 4,492,089 | * 1/1985 | Rohner et al. | ................... 138/149 X |
| 5,722,462 | 3/1998 | Dridi et al. | .......................... 138/149 |

FOREIGN PATENT DOCUMENTS 2563608  10/1985  (FR) .

* cited by examiner

*Primary Examiner*—Patrick Brinson
(74) *Attorney, Agent, or Firm*—Ostrolenk, Faber, Gerb & Soffen, LLP

(57) ABSTRACT

It is of the type having a thermal insulaton structure placed around a central core (1) of longitudinal axis and it is characterized in that the thermal insulaton structure comprises at least one layer (3) consisting of separate solid strips (4), each strip being wound with a very long pitch and a maximum wind angle to the horizontal axis of less than 30°.

18 Claims, 2 Drawing Sheets

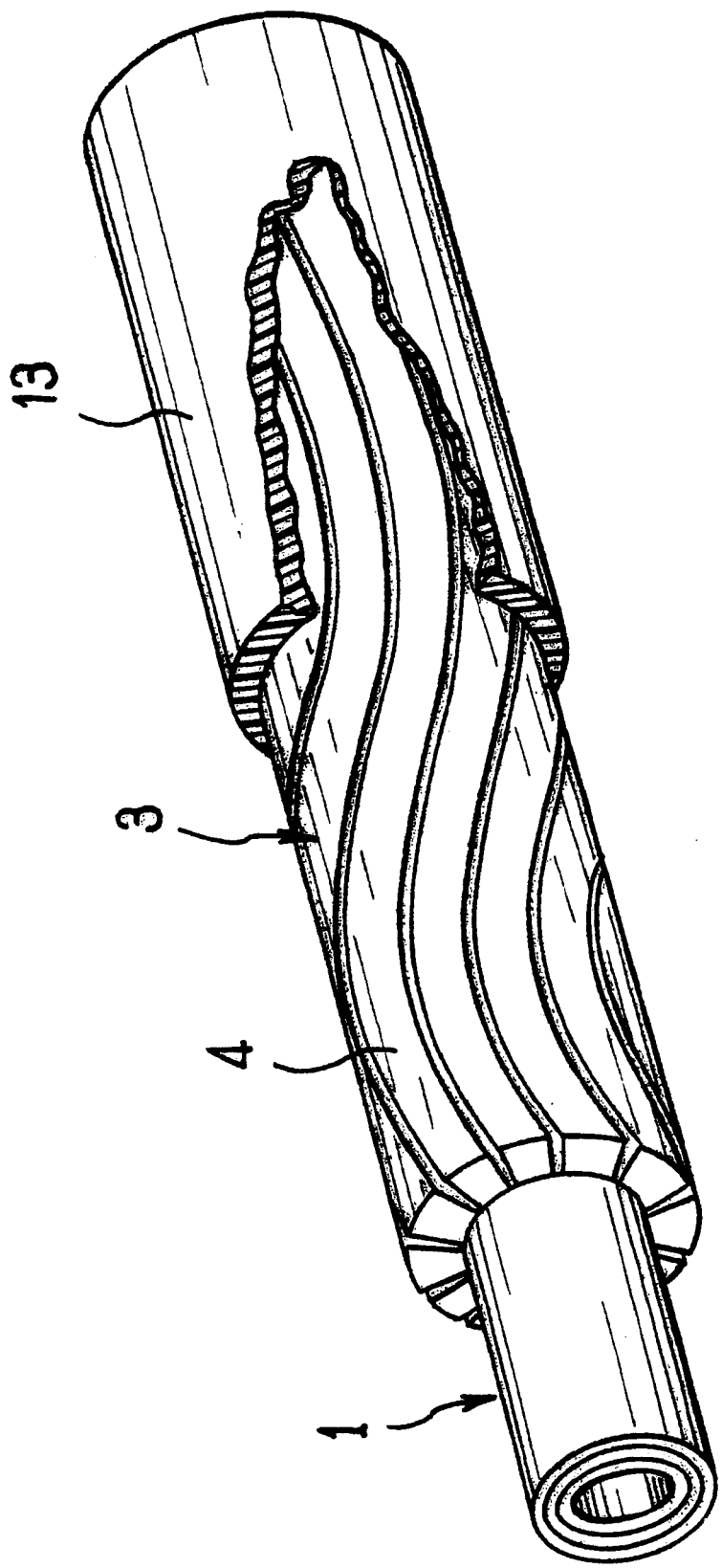
FIG_1

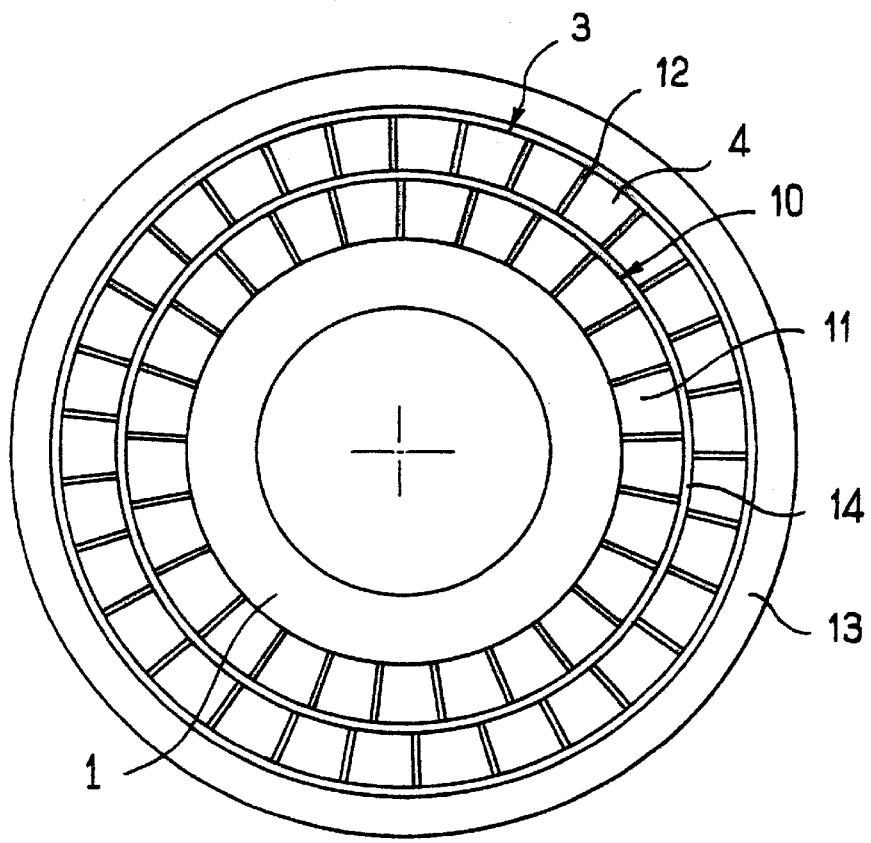
FIG_2
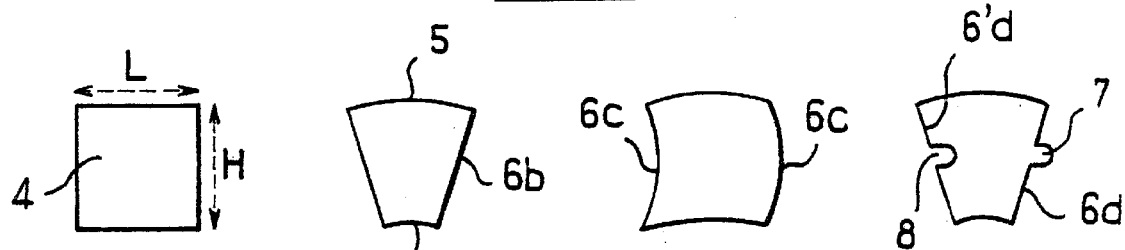
FIG_3a  FIG_3b  FIG_3c  FIG_3d
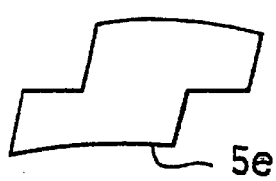
FIG_3e
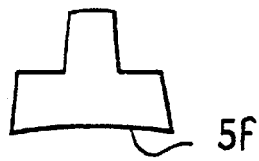
FIG_3f

LAGGED PIPE FOR TRANSPORTING FLUIDS

BACKGROUND OF THE INVENTION

The present invention relates to a lagged pipe for transporting fluids and more particularly to a flexible pipe used for transporting hydrocarbons from a subsea well.

It is becoming increasingly necessary for flexible pipes to be well insulated because of the operating conditions under which offshore oil deposits are worked. This is because the heavy oils in these deposits tend to solidify while they are being transported between the subsea production well and the surface equipment, such as a platform, as a result of heat losses in the flexible pipe submerged in the sea. Good thermal insulation is also desirable in order to avoid the formation of hydrates to which certain crude oils are liable as they cool down.

The known prior solutions are described in FR-A-2,563,608. One of the improvements recommended by FR-A-2,563,608 consists in placing, around the internal core of the pipe, a plurality of annular partitions distributed along the length of the core and integral with the latter, in filling the annular chambers made between the successive partitions with an insulation material, in continuously extruding an outer sheath over the partitions, the space between two successive partitions being between 20 and 200 m depending on the service conditions. According to another improvement described in that document, the thermal insulation is obtained by spiralling hollow tubes around the central core, the tubes having a diameter of between 5 and 30 mm and a thickness of 0.5 to 4 mm. In all the embodiments, the bands of thermal insulation must offer a certain resistance to the hoop stress and a certain mechanical strength to be able to transfer the clamping loads to the tensile armour plies. Because of the short-pitch winding of these bands of thermal insulation, the corresponding layers tend to behave as rings and they therefore offer great resistance to radial deformation, such resistance being called the "vault effect" by the experts. When the number of thermal insulation layers is increased, as is the case in very deep applications, the force transferred to the tensile armour plies is relatively small compared with the force applied by the tensioners, as described below, which considerably reduces the capacity of the laying system. The vault effect becomes significant when $nEe^3 > 400$ Nm, where n is the number of layers, E is the Young's modulus and e the thickness of one layer.

Pipes with such a thermal insulation exhibit what the experts call the "vault effect" and their applications are limited by the number of thermal insulation layers. It is important to note or recall that so-called rigid or flexible pipes, when they are being unwound from the holding reel or reels placed on a laying barge, pass through devices called tensioners whose purpose is especially to take up most of the weight of a pipe or of the tensile loads on the latter before it is submerged in the water. Such tensioner devices are well known and described, for example, in U.S. Pat. No 4,345,855. In order for these tensioners to fulfil their role fully, the maximum clamping force of the tensioners must be transferred, at least mostly, if not completely, to the central core of the pipe.

In a rigid or almost-rigid pipe, as in a pipe with an "external vault", the resistance to the transfer of the application force of the tensioners is too high and only part of the applied force is transferred to the central this is insufficient to take up the weight of the pipe or the tensile forces in the latter.

In a pipe thermally insulated by means of superposed layers of thin bands wound with a short pitch, that is to say with a wind angle of greater than 55°, or in a pipe of the type described in FR-A-2,563,608, the application force of the tensioners deforms the insulating structure very considerably at the clamping pads of the tensioners while causing the insulating structure between the pads to creep or expand, thus forming kinds of bulges between the pads. Curves of the force ($F_T$) transferred to the central core as a function of the force ($F_P$) applied by the pads of the tensioners, for various thicknesses $\underline{e}$ of a compliant insulating structure, show that as $\underline{e}$ increases, the transferred force ($F_T$) becomes relatively low. However, if a thin insulating structure is produced, then the thermal insulation obtained is unsatisfactory or not effective enough.

SUMMARY OF THE INVENTION'S

The object of the present invention is to propose a novel thermal insulation structure for pipes, which makes it possible to avoid the vault effect, ensure good thermal insulation and be easily mounted in a pipe, while not requiring a bulky and expensive winding machine such as a spiralling machine.

One subject of the present invention is a lagged pipe for transporting fluids having a thermal insulation structure placed around a central core, and it is characterized in that the thermal insulaton structure comprises at least one layer consisting of separate solid strips, each strip being wound with a very long pitch and a maximum wind angle around the said core of less than 30°.

One advantage of the present invention is that it is possible to use strips of greater thickness while still ensuring good transfer of the application force of the tensioners to the central core on the one hand, and good thermal insulation on the other. This comes from the fact that the osculating radius of the strips on the central core is, because of the relatively long pitch at which the strips are wound, much greater than the osculating radius of bands or tubes wound with a short pitch. Consequently, it is no longer necessary to wind a large number of insulating layers around the central core.

Another feature of the invention is that the strips are wound in an S/Z configuration. This allows a winding machine much less expensive than a spiralling machine to be used.

Another feature of the invention lies in the fact that the radially opposed faces of each profile are non-planar, and preferably slightly curved, so that the lower face of each strip well matches the curvature of the central core.

In another embodiment the strip has lateral faces which at least partially imbricate with the lateral faces of the following strip so as to improve the cohesion of the layer formed by the juxtaposed strips and avoid thermal bridges between turns.

BRIEF DESCRIPTION OF THE DRAWINGS

Further advantages and features will become more apparent on reading the description of several preferred embodiments of the invention, and on examining the appended drawings in which:

FIG. 1 is a perspective view, partially cut away, of a pipe provided with a thermal insulation structure according to a first embodiment of the invention;

FIG. 2 is a schematic cross-sectional view of a pipe provided with a thermal insulation formed by two layers of strips;

FIGS. 3a to 3f schematically illustrate different cross sections of the strip in FIGS. 1 and 2.

DESCRIPTION OF PREFERRED EMBODIMENTS

A rigid or flexible pipe comprises a central core formed by elements placed concentrically on top of each other. Depending on the nature of the innermost element of the central core, the pipe is called a "smooth bore" pipe when the innermost element is a polymer sheath and, in this case, it is covered with a pressure vault made by winding an interlocking or non-interlocking wire with a short pitch, of about 70 to 80°; it is called a "rough bore" pipe when the innermost element is formed by a metal carcass, which is also formed by a wire wound with a short pitch and which is surrounded by a polymer sheath. In both types of pipe, tensile armour plies are wound around the adjacent lower layer, generally an intermediate polymer sheath. The pipe comprises at least two plies of armour, with opposite winding directions and suitable lay angles. An outer sheath is provided as final layer. The structure of such pipes is well known and the reader may usefully refer to the many patents and articles published in the name of the assignee, who has been manufacturing rigid and flexible pipes for decades.

FIG. 1 illustrates a central core 1, having a longitudinal axis, all around which a thermal insulation structure is placed. The thermal insulation structure comprises at least one layer 3 formed by solid strips 4 which are separate from each other. Each strip 4 is wound over the central core 1 with a very long pitch and with a lay angle of between 20 and 30°, and preferably with a lay angle of close to 20° to the longitudinal axis of the central core 1. Each strip is wound in a reverse-pitch helical winding of the elongated S/Z type, as illustrated in FIG. 1.

Of course, the winding of each strip 4 may be in a helix of constant pitch, but always with a wind angle or lay angle of less than 30° to the longitudinal axis of the central core 1.

The cross section of the strips 4 may be polygonal or may have other shapes such as those illustrated in FIGS. 3a to 3f. FIG. 3a illustrates a square cross section of the strip 4 although a rectangular or trapezoidal cross section may also be adopted as long as the dimensions which will be specified below are observed.

In order to improve the contact of the strips 4 on the outermost layer of the central core 1, which is generally a polymer sheath, it is preferable for the radially opposed faces of the strips to be non-planar or at the very least for the lower face 5, which faces the last layer 10 of the central core, to be slighlty curved.

The strips 4 may furthermore have lateral faces which allow better contact or mutual imbrication. The cross section of the strip illustrated in FIG. 3b comprises radially opposed faces 5 which are curved and straight lateral faces 6b, whereas the cross section in FIG. 3c comprises curved radially opposed faces and curved lateral faces 6c. In FIG. 3d, the cross section of the strip 4 comprises a rib 7 on one lateral face 6d and a groove 8 in the opposite lateral face 6'd so that, when two strips 4 are wound side by side, they can be imbricated in each other by the rib 7 of one of the strips penetrating the groove 8 in the other strip.

According to another embodiment of the strips 4, a Z-shaped or T-shaped cross section may be used, as illustrated in FIGS. 3e and 3f, which cross sections also have the advantage of imbricating in each other effectively. In addition, at least the lower faces 5e and 5f are advantageously curved in order to ensure good contact with the central core. Of course, the radial faces opposite the lower faces 5e and 5f may be straight or curved.

The thermal insulation structure illustrated in FIG. 2 comprises two radially overlaid layers 3 and 10, each being formed by strips 4 and 11 which may or may not be identical and which may have cross sections such as those illustrated in FIGS. 3a to 3f.

The layers 3 and 10 are wound with crossed or reversed pitches, like the pairs of tensile armour plies. According to another configuration, the strips 11 of the layer 10 are placed so that they overlap the strips 4 of the layer 3, that is to say each strip 11 of the layer 10 straddles two consecutive strips 4 of the lower layer 3 or else each strip 11 covers the gap 12 between two consecutive strips 4.

Furthermore, in the case of a multilayer insulation structure, an adhesive retaining band 14 may possibly be placed between two consecutive layers, as is illustrated in FIG. 2.

Whether the thermal insulation structure according to the invention is a monolayer or a multilayer structure, it is completed with a protective polymer sheath 13.

Each strip 4 and/or 11 has a height H of between 15 and 100 mm and a width L such that the ratio H/L is between 0.2 and 2 and preferably between 0.7 and 1.2.

The strips 4 and/or 11 are solid and made of a plastic such as CPVC or an elastomer-based syntactic foam, the plastic having a compressive strength compatible with the depth of water in which the flexible pipe according to the invention is used and a thermal conductivity of 0.25 W/m.K or less.

For depths roughly of the order of 400 meters, the compressive strength of the plastic used will be about 4 MPa at room temperature and for a strain of 10%.

When the thermal insulation according to the invention comprises a certain number of strips wound around each other and forming assemblies of successive layers of strips, each assembly then comprising several layers of strips, it may happen that some strips have mechanical properties which are too poor to transfer, without deterioration, the forces exerted by the laying means such as the tensioners. In this case, according to the invention, one or more windings of strips having good mechanical properties, such as a high compressive strength, are inserted into each assembly of layers so as to improve transfer of the forces applied to the flexible pipe by the laying means.

What is claimed is:

1. Lagged pipe for transporting fluids comprising a central core with a longitudinal axis, a thermal insulation structure placed around the core, the thermal insulation structure comprising at least one layer comprised of separate solid strips, each strip being wound with a very long pitch and a maximum wind angle to the horizontal axis of less than 30°.

2. Pipe according to claim 1, wherein the strip is wound in an S/Z configuration.

3. Pipe according to claim 1, wherein the strip is wound in a helix of constant pitch.

4. Pipe according to claim 1, wherein the thermal insulation structure comprises at least two superposed radially outer and inner layers of the strips, the strips of the radially outer layer being placed so that they overlap on the strips of the radially inner layer.

5. Pipe according to claim 1, wherein each strip has a polygonal cross section with a height H of between 15 and 100 mm and a width L such that the ratio H/L is between 0.2 and 2.

6. Pipe according to claim 1, wherein the strips have non-planar radially opposed faces.

7. Pipe according to claim 1, wherein the strips have non-planar opposed lateral faces.

8. Pipe according to claim 1, wherein the strips have a Z-shaped or T-shaped cross section.

9. Pipe according to claim 1, wherein the strips are made of a plastic.

10. Pipe according to claim 9, wherein the plastic has a thermal conductivity of 0.25 W/m.K or less.

11. Pipe according to claim 7, wherein the strips have opposite lateral faces and the lateral faces of the strips are at least partially imbricated in each other.

12. Pipe according to claim 4, wherein at least one adhesive band is placed between the two superposed layers.

13. Pipe according to claim 1, further comprising a plurality of the layers of strips wound over each other, at least some of the layers being formed by windings of strip having relatively poor mechanical properties, at least one of the layers being formed of a winding of strips having good mechanical properties in order to transfer forces applied to the pipe by means which lay the pipe.

14. Pipe according to claim 1, wherein the strips have non-planar opposed lateral faces.

15. Pipe according to claim 4, wherein the strips have a Z-shaped or T-shaped cross section.

16. Pipe according to claim 9, wherein the strips are made of CPVC.

17. Pipe according to claim 9, wherein the strips are made of an elastomer-based syntatic foam.

18. Pipe according to claim 8, wherein the strips have opposite lateral faces and the lateral faces of the strips are at least partially imbricated in each other.

* * * * *